(12) United States Patent
Akahane et al.

(10) Patent No.: US 8,270,009 B2
(45) Date of Patent: Sep. 18, 2012

(54) IMAGE FORMING APPARATUS, IMAGE FORMING SYSTEM, AND SCREEN DISPLAY METHOD, ALL CAPABLE OF DISPLAYING AN OPERATION SCREEN WITHOUT DAMAGING ANY INTRINSIC PERFORMANCE OF THE IMAGE FORMING APPARATUS

(75) Inventors: Tetsuya Akahane, Sagamihara (JP); Tadashi Suzue, Hachioji (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 1020 days.

(21) Appl. No.: 12/044,598

(22) Filed: Mar. 7, 2008

(65) Prior Publication Data
US 2008/0278748 A1 Nov. 13, 2008

(30) Foreign Application Priority Data

May 10, 2007 (JP) .................................. 2007-125531

(51) Int. Cl.
*G06F 3/12* (2006.01)
*G06F 3/00* (2006.01)
*G06F 3/048* (2006.01)
*H04N 1/00* (2006.01)
*H04N 1/60* (2006.01)

(52) U.S. Cl. ......... 358/1.15; 358/1.6; 358/1.9; 715/700; 715/778; 715/783; 715/809

(58) Field of Classification Search ................. 358/1.15, 358/1.6, 1.9, 3.01, 3.2, 3.23, 3.24; 715/778, 715/273, 700, 719, 783, 805, 808, 809, 841, 715/851, 855, 864, 867, 985
See application file for complete search history.

(56) References Cited

U.S. PATENT DOCUMENTS
2006/0120616 A1* 6/2006 Kita ............................. 382/254
(Continued)

FOREIGN PATENT DOCUMENTS
JP 10-222436 8/1998
(Continued)

OTHER PUBLICATIONS

Nobuaki, Compound device language display device and method, program, and recording medium for recording program, Sep. 3, 2006, JP2006067382 (Japanese machine translation).*

(Continued)

*Primary Examiner* — Benny Q Tieu
*Assistant Examiner* — Ngon Nguyen
(74) *Attorney, Agent, or Firm* — Finnegan, Henderson, Farabow, Garrett & Dunner, L.L.P.

(57) ABSTRACT

Disclosed is an image forming apparatus comprising: a control section; and a display section connected to a system bus, wherein the display section comprises: a display device; a screen data storage section to temporarily store screen data of an operation screen; and a display control section to display the operation screen based on the screen data, and wherein the control section comprises: a storage section to store the screen data of the operation screen; and a controller to transfer the screen data of the operation screen pertaining to a function provided to the image forming apparatus to the screen data storage section through the system bus after a power source is turned on and before the function becomes operable; and to control the display control section to display the operation screen based on the screen data stored in the screen data storage section, after the function becomes operable.

9 Claims, 14 Drawing Sheets

U.S. PATENT DOCUMENTS

2007/0159663 A1* 7/2007 Tsujimoto .................... 358/448

FOREIGN PATENT DOCUMENTS

| JP | 11-202840 | 7/1999 |
|----|-----------|--------|
| JP | 2002-281195 | 9/2002 |
| JP | 2006-67382 | 3/2006 |

OTHER PUBLICATIONS

Takahiko, Remote Control System for OA Equipment . . . , Sep. 27, 2002, Machine Translation Japanese Patent Application Publication, JP2002281195, all pages.*

Japanese Office Action dated May 20, 2009.

* cited by examiner

FIG. 6A

PLEASE WAIT A LITTLE WHILE.

FIG. 6B

KONICAMINOLTA

FIG. 7

NORMAL SCREEN

| COPY | SCANNER | SAVE | READ | JOB MANAGEMENT | MACHINE STATE |

COPY RESERVATION AVAILABLE  SET NUMBER OF COPIES 001
NUMBER OF RESERVED JOBS 2

--OUTPUT JOB--
USER NAME ****
9 / 10

ORIGINAL SETTING

IMAGE QUALITY SETTING

AUTOMATIC

MAGNIFICATION RATIO SETTING 1.000

SAME MAGNIFICATION
AUTOMATIC

APPLICATION SETTING

BINDING MARGIN
REPEAT

CHANGE

ORIGINAL READING

SHEET FINISHING

SCREEN SELECTION

BOTH SIDES → BOTH SIDES
BOTH SIDES → ONE SIDE
ONE SIDE → BOTH SIDES
ONE SIDE → ONE SIDE

SHEET SETTING

NO IMAGE ROTATION

55 × 85WR  PLAIN SHEET

B4  PLAIN SHEET

A4WR  INDEX
A4  PLAIN SHEET
A4  PLAIN SHEET
AUTOMATIC

BINDING MARGIN | STAPLE | PUNCH | STAMP | FRAME/FOLD REMOVING | JOB MEMORY 1 | JOB MEMORY 2

VRAM AREA CONFIGURATION

IMAGE FORMING APPARATUS, IMAGE FORMING SYSTEM, AND SCREEN DISPLAY METHOD, ALL CAPABLE OF DISPLAYING AN OPERATION SCREEN WITHOUT DAMAGING ANY INTRINSIC PERFORMANCE OF THE IMAGE FORMING APPARATUS

BACKGROUND OF THE INVENTION

1. Field of the Invention

The present invention relates to an image forming apparatus provided with a display section to display various operation screens, an image forming system including the image forming apparatus, and a display method of the operation screens.

2. Description of Related Art

A copier and a multifunction peripheral (hereinafter, these apparatus are generically named as image forming apparatus), both including a copying function, a facsimile function, a printer function, a scanner function, and the like, have become widely used. The image forming apparatus comprises a network connecting section for connecting the image forming apparatus with a communication network, an image processing section for generating printable image data based on the data input through the network connecting section, an image memory control section for performing the control of storing the generated image data and the image data read with a scanner into an image memory, and the control of reading image data from the image memory to output the read image data to a printer, an operation display section for displaying an operation screen for performing setting operations of various functions of the scanner, the printer, and the like, a control section for controlling the whole apparatus, and the like. These components are mutually connected through a system bus.

Because a user can set many items in the image forming apparatus equipped with the above various functions, the image forming apparatus is adapted to display various screens in the operation display section thereof in order to makes it easy for the user to confirm various setting operations and set states, and various proposals have been performed with regard to the display control of the operation screens (see, for example, Japanese Patent Application Laid-Open Publication No. 11-202840).

The operation display section of the image forming apparatus now tends to be enlarging the screen size thereof owing to the increase of the items to be set in association with the enrichment of the functions and the performance of the image forming apparatus, price-reduction of parts such as an LCD, and the like. Moreover, because images, animations, and the like, are also displayed in the operation display section in order to improve the operationality of the image forming apparatus, the control of the operation display section has become complicated. The load to be burdened on the screen control of the CPU to control the operation of the image forming apparatus has been increasing.

A method of dispersing processing by providing a control section (for example, an LCD controller) for controlling the operation display section apart from the CPU of the main body of the image forming apparatus has been used accordingly, but the size of screen data for displaying an operation screen has also become larger in accordance with the enlargement of the operation display section and the complication of the content of display. Consequently, the lowering of the data transfer performance of the system bus of the image forming apparatus and the like have occurred owing to the contention between the image data for printing and the screen data for operation screen formation, and the lowering and the like have exerted the influences on the operations of the image forming apparatus and the screen display switching speed thereof.

SUMMARY OF THE INVENTION

The present invention was made in view of the above mentioned problems. The principal object of the invention is to provide an image forming apparatus, an image forming system, and a screen display method, all capable of displaying an operation screen without damaging any intrinsic performance of the image forming apparatus.

To achieve at least one of the above objects, the image forming apparatus reflecting one aspect of the present invention, comprises:

a control section; and a display section connected to a system bus of the control section, wherein the display section comprises:

a display device;

a screen data storage section to temporarily store screen data of an operation screen; and a display control section to instruct the display device to display the operation screen of the image forming apparatus based on the screen data, and wherein the control section comprises:

a storage section to store the screen data of the operation screen; and a controller to transfer the screen data of the operation screen pertaining to a function provided to the image forming apparatus to the screen data storage section through the system bus after a power source of the image forming apparatus is turned on and before the function becomes an operable state, the screen data being stored in the storage section in advance; and to control the display control section to instruct the display device to display the operation screen based on the screen data stored in the screen data storage section, after the function becomes the operable state.

Preferably, the screen data is data for each divided part of the operation screen; and the display control section produces data for each layer based on the data for each part, and synthesizes the data for each layer to instruct the display device to display the operation screen.

Preferably, the image forming apparatus further comprises a network connecting section to perform communication with a computer terminal, wherein the controller transfers the data for each layer, which is stored in the screen data storage section, to the computer terminal by the network connecting section, when a transmission of the screen data of the operation screen is requested from the computer terminal.

To achieve at least one of the above objects, the image forming system reflecting another aspect of the present invention, comprises:

an image forming apparatus; and a computer terminal which are connected through a communication network, the image forming apparatus including a control section and a display section connected to a system bus of the control section, wherein the display section comprises:

a display device;

a screen data storage section to temporarily store screen data of an operation screen; and a display control section to instruct the display device to display the operation screen of the image forming apparatus based on the screen data, and wherein the control section comprises:

a storage section to store the screen data of the operation screen; and a controller to transfer the screen data of the operation screen pertaining to a function provided to the image forming apparatus to the screen data storage section through the system bus after a power source of the image forming apparatus is turned on and before the function becomes an operable state, the screen data being stored in the storage section in advance; and to control the display control section to instruct the display device to display the operation screen based on the screen data stored in the screen data storage section, after the function becomes the operable state, wherein the controller transfers data for each layer, which is stored in the screen data storage section, to the computer terminal when a transmission of the screen data of the operation screen is requested from the computer terminal.

Preferably, the screen data is data for each divided part of the operation screen; and the display control section produces the data for each layer based on data for each part, and synthesizes the data for each layer to instruct the display device to display the operation screen.

To achieve at least one of the above objects, the screen display method reflecting still another aspect of the present invention, the screen display method using an image forming apparatus including a display section connected to a system bus of a control section, the method comprises:

turning on a power source of the image forming apparatus;

transferring screen data of an operation screen pertaining to a function previously provided to the image forming apparatus to a screen data storage section of the display section through the system bus after the turning-on of the power source of the image forming apparatus and before the function becomes an operable state, the screen data being stored in a storage section of the control section in advance; and displaying the operation screen on a display device of the display section based on the screen data stored in the screen data storage section, after the function becomes the operable state.

Preferably, the screen data is configured as data for each divided part of the operation screen, in the transferring, the data for each divided part is transferred from the storage section to the screen data storage section, and in the displaying, data for each layer is produced based on the data for each part, and the data for each layer is synthesized to display the operation screen on the display device.

Preferably, the control section transfers the data for each layer, which is stored in the screen data storage section, to a computer terminal, when a transmission of the screen data of the operation screen is requested from the computer terminal which is connected to the image forming apparatus through a communication network.

As described above, in the present invention, the controller of the control section transfers the screen data stored in the storage section of the control section to the screen data storage section of the display section as data of each part obtained by dividing the data in advance after the power source of the image forming apparatus has been turned on, and before a function provided to the image forming apparatus has become the operable state thereof. After the function provided to the image forming apparatus has become the operable state, the controller of the control section controls the display control section to perform the following operations: producing data of each layer from the data of each part, stored in the screen data storage section; synthesizing the data of each layer; and controlling a display device to make the display device display an operation screen in it. Thus, the lowering of the data transfer performance owing to the contention of data can be suppressed, and the operation screen can be displayed without damaging any intrinsic performance of the image forming apparatus.

Further, in the image forming system in which the image forming apparatus and the computer terminal is connected through a communication network, when a transmission of screen data of the operation screen is requested from the computer terminal, the controller of the control section controls the image forming apparatus so that the data of each layer, stored in the screen data storage section of the display section is transmitted to the computer terminal. Thus, it is unnecessary to perform any handling, such as screen synthesization, in the controller of the control section, and the operation screen can be displayed on the computer terminal without damaging the intrinsic performance of the image forming apparatus.

According to the image forming apparatus, the image forming system, and the screen display method of the present invention, an operation screen can be displayed without damaging the intrinsic performance of the image forming apparatus.

The reason is that the lowering of data transfer performance owing to the contention of data can be suppressed by the following performance of the CPU of an image forming apparatus including an operation display section and a control section; the operation display section connected to the system bus of the control section; the control section including the CPU and a memory for storing image data; the operation display section including a display device, such as an LCD, a display control section, such as an LCD controller for controlling the LCD, and a screen data storage section, such as a VRAM, for storing the image data temporarily. That is, the CPU transfers the screen data stored in advance in the memory to the VRAM as part data which is obtained by dividing the data for each part after the power source of the image forming apparatus has been turned on, and before a function provided to the image forming apparatus becomes the operable state thereof. After the function provided to the image forming apparatus has become the operable state, the CPU controls the LCD controller to perform the following operations: producing layer data from the part data stored in the VRAM; synthesizing the layer data; and controlling a display device to make the display device display an operation screen in it.

Moreover, the reason is also as follows. That is, when an image forming apparatus is required to transmit screen data of an operation screen by a computer terminal in an image forming system in which the image forming apparatus is connected to the computer terminal through a communication network, the CPU of the image forming apparatus performs the control of sequentially reading layer data stored in a screen data storage section to transmit the read layer data to the computer terminal. Consequently, it is unnecessary to perform any handling, such as screen synthesization, in the CPU.

BRIEF DESCRIPTION OF THE DRAWINGS

The present invention will become more fully understood from the detailed description given hereinbelow and the appended drawings, and thus are not intended as a definition of the limits of the present invention, and wherein;

FIG. 6A is a view showing an example of a screen (provisional screen) displayed in the display section in the image forming apparatus according to the first embodiment of the present invention;

FIG. 6B is a view showing an example of a screen (provisional screen) displayed in the display section in the image forming apparatus according to the first embodiment of the present invention;

FIG. 7 is a view showing a configuration example of a screen (normal screen) displayed in the display section of the image forming apparatus according to the first embodiment of the present invention;

DETAILED DESCRIPTION OF THE PREFERRED EMBODIMENTS

As shown with regard to the related art, the size of the operation screen of an image forming apparatus, such as a digital copier, has been becoming larger and larger, and an operation display section performs a graphical display. Accordingly, in order to reduce the load to be imposed on the screen control of a CPU, a method of proving a display control section (for example, an LCD controller) for controlling the operation display section apart from the CPU of the main body of the image forming apparatus to disperse processing has been used. In a system bus connecting the CPU to the LCD controller, the lowering of data transfer performance owing to the contention between image data and screen data, and the like, are produced in association with the enlargement of the size of the screen data for forming an operation screen, and the contention exerts an influence upon the operation of the image forming apparatus and a screen display changing speed.

Figure 13:
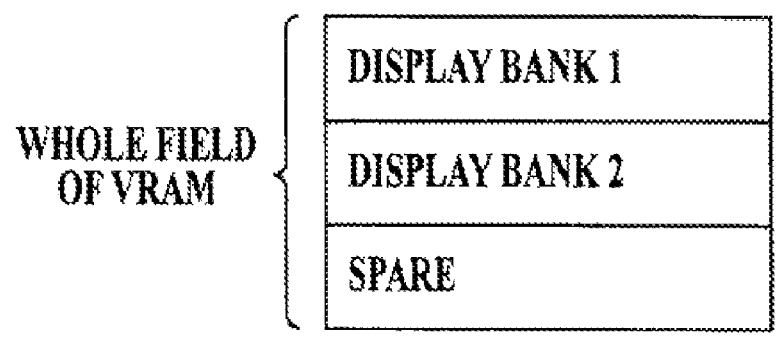
FIG. 13 is a diagram showing the area configuration of a VRAM of a conventional image forming apparatus.
Figure 14:
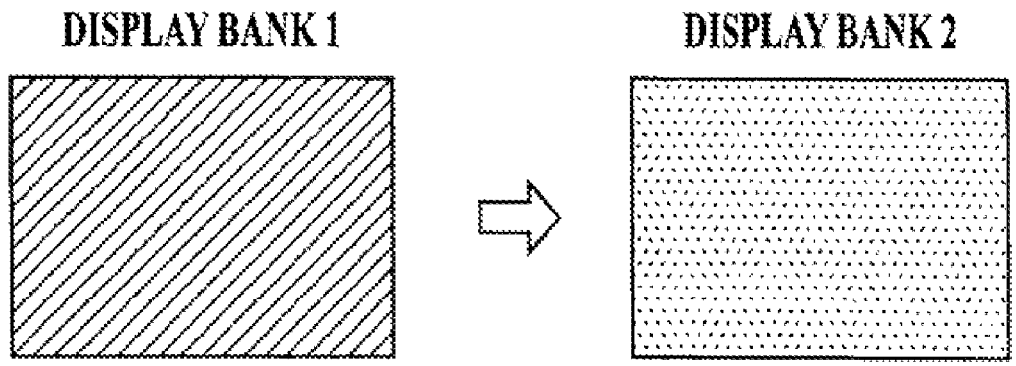
FIG. 14 is a diagram schematically showing a display changing operation of the conventional image forming apparatus.

In order to solve the problem mentioned above, the following method has been also used. The method enlarges the capacity of the screen data storage section (VRAM) of the operation display section to configure the screen data storage section so as to be divided into a plurality of areas of a bank for a screen displayed at the present time and vacant banks as shown in FIG. 13, and performs the changing of the banks as shown in FIG. 14 to improve the screen display changing speed.

However, when a change of screen display is performed when a function provided to the image forming apparatus is being operated, the contention between image data for printing and screen data for screen display is produced, and the data transfer performance is lowered even by this method. Moreover, because the screen data is produced per screen, the data transfer performance is likewise lowered when the screen data of a large size is transferred. Moreover, when a computer terminal controlling the image forming apparatus displays a screen of the image forming apparatus, the load to be imposed on the screen control of the CPU of the computer terminal is enlarged when the screen data is generated by the CPU.

Accordingly, first of all, the embodiments of the present invention do not transfer screen data regardless of the state of an image forming apparatus, and do not stream any screen data into the system bus of the image forming apparatus except for at the time of initializing the system in the screen control of the image forming apparatus. That is, the embodiment of the present invention transfers the screen data stored in the working memory of a CPU or a ROM (or a flash memory) to a VRAM after the turning-on of the power source of the image forming apparatus, and before a function provided to the image forming apparatus becomes the operable state thereof.

Moreover, secondly, the embodiments of the present invention do not transfer the data per screen to the VRAM, but transfer part data which is the data of each part of divided each screen, to suppress the lowering of data transfer performance. To put it concretely, the embodiment of the present invention transfers the part data from the CPU to the VRAM to store the transferred part data into the VRAM. Then, an LCD controller generates layer data from the part data and synthesizes the layer data to make the display device, such as an LCD, display an operation screen. That is, the control of the screen is performed by the register control of the LCD controller.

Moreover, thirdly, when the transmission of screen data of an operation screen is requested from a computer terminal via a network, the embodiments of the present invention do not perform the processing of the screen data by the CPU, but transfers the layer data in the VRAM to the computer terminal.

By these configurations, it becomes possible to perform LCD display (a screen change) rapidly without deteriorating the intrinsic performance of the image forming apparatus.

[Embodiment 1]

Figure 1:
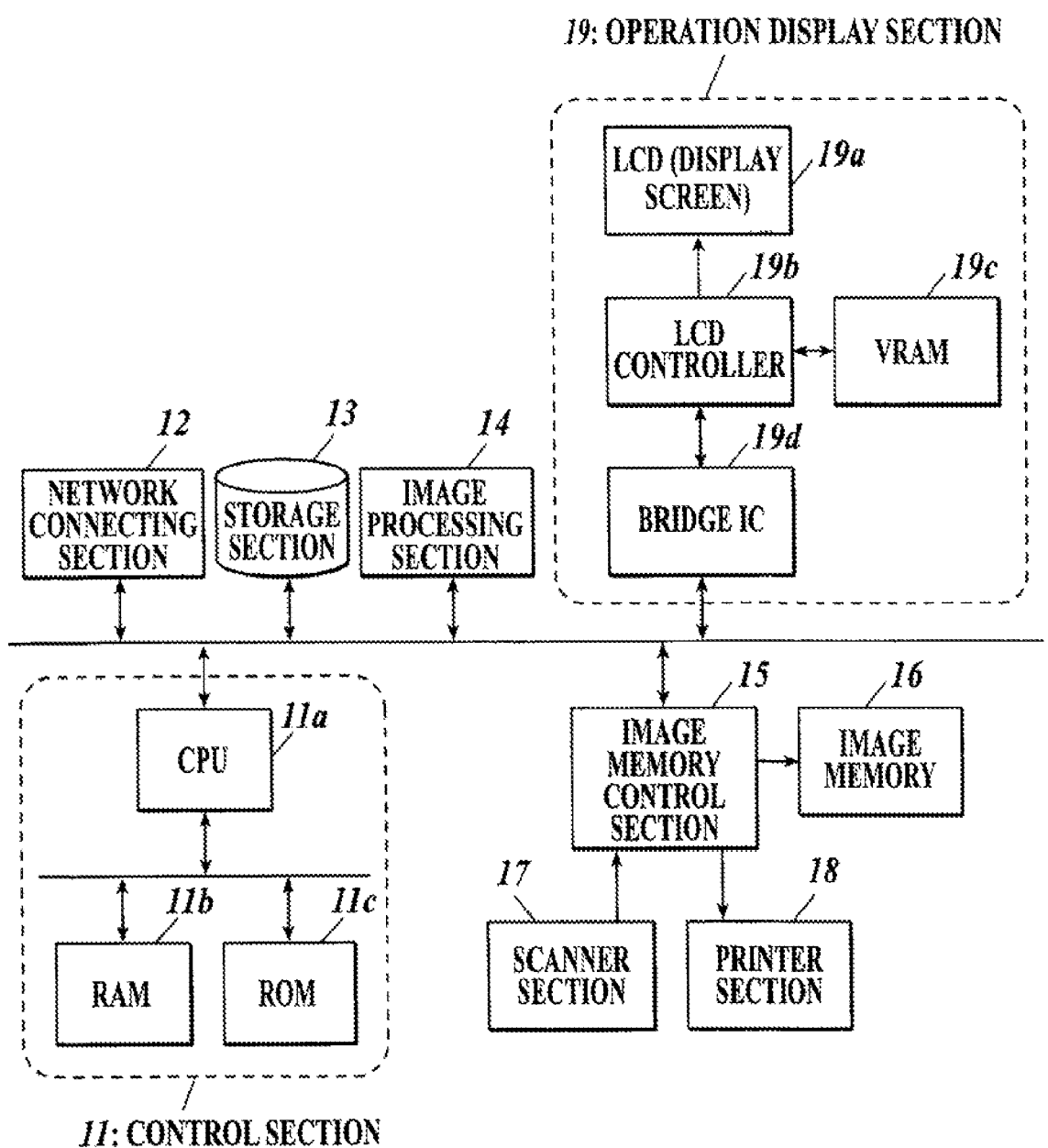
FIG. 1 is a block diagram showing the configuration of an image forming apparatus according to a first embodiment of the present invention.
Figure 2:
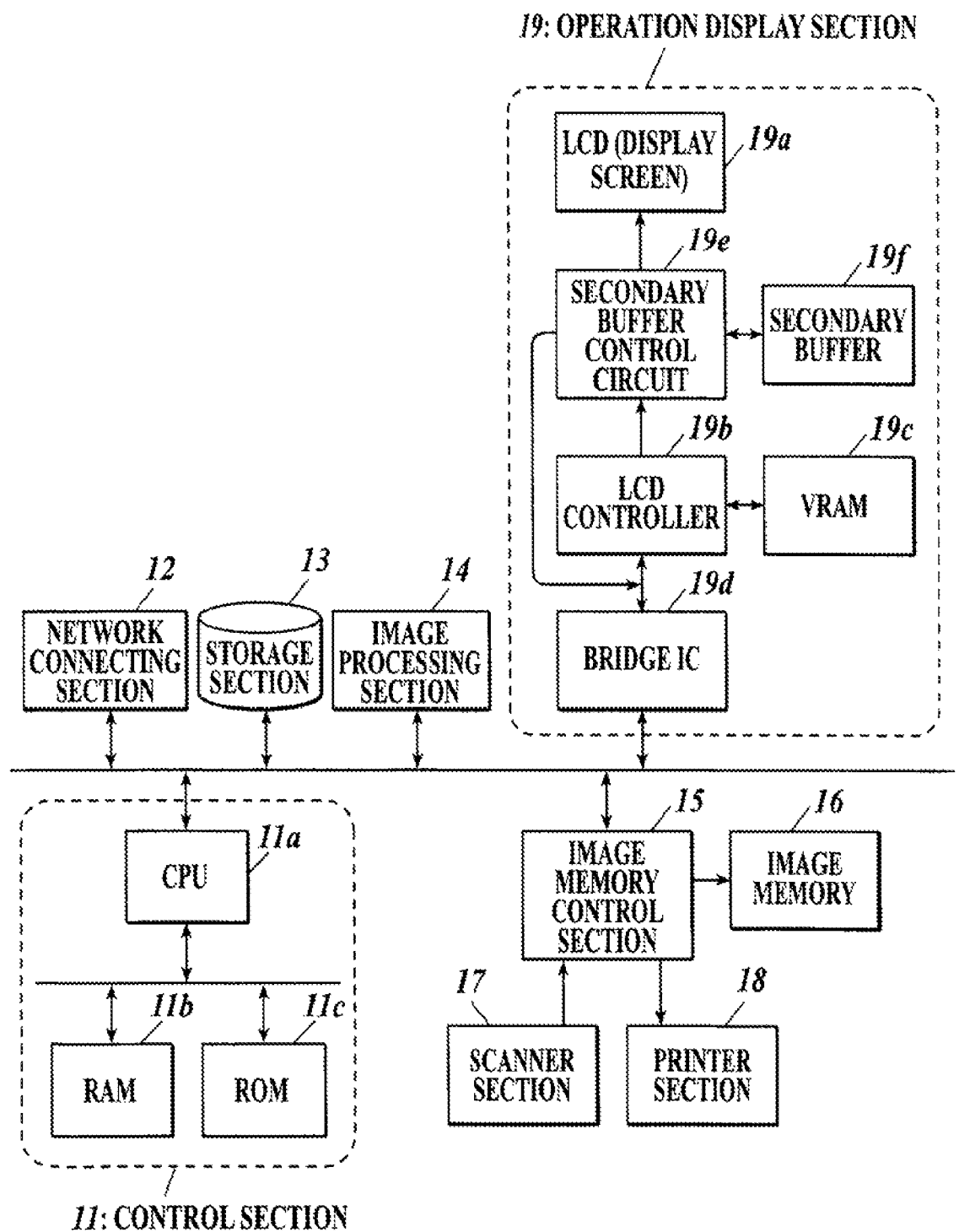
FIG. 2 is a block diagram showing another configuration of the image forming apparatus according to the first embodiment of the present invention.
Figure 3:
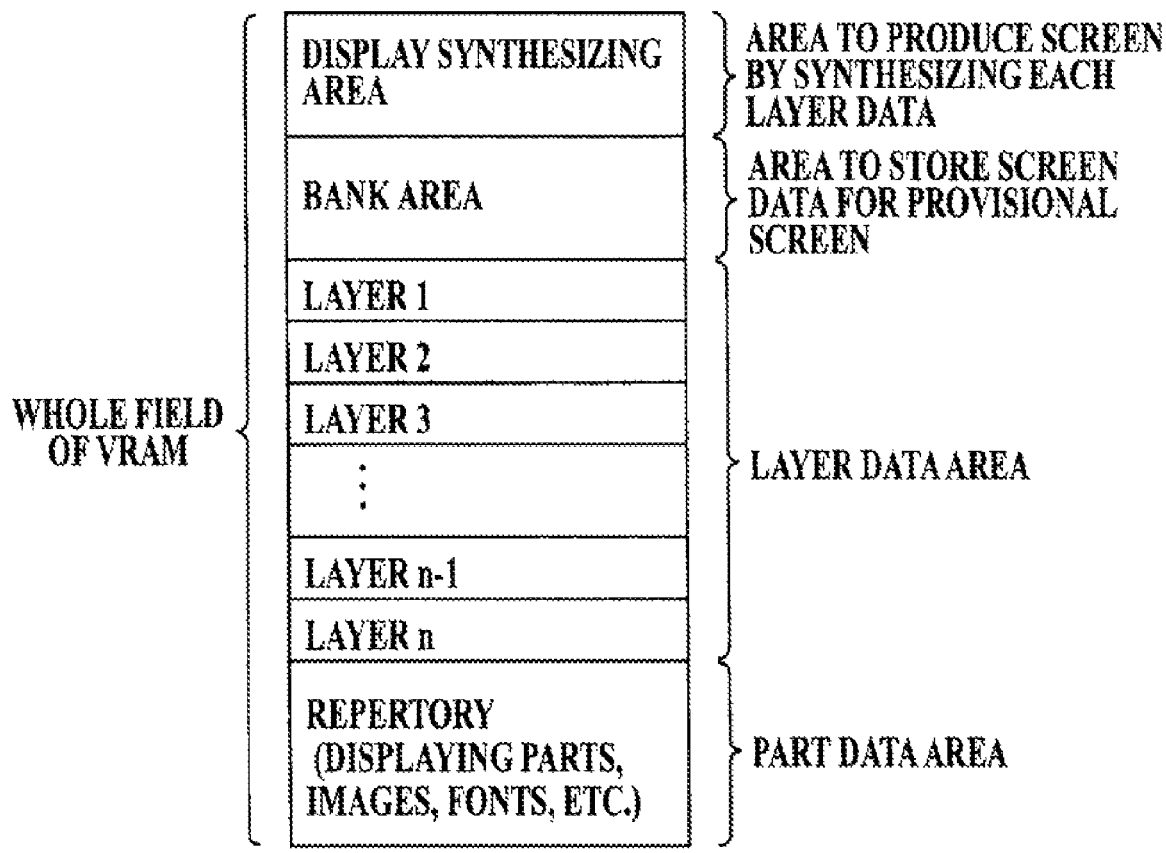
FIG. 3 is a diagram showing the area configuration of a VRAM of the image forming apparatus according to the first embodiment of the present invention.
Figure 4:
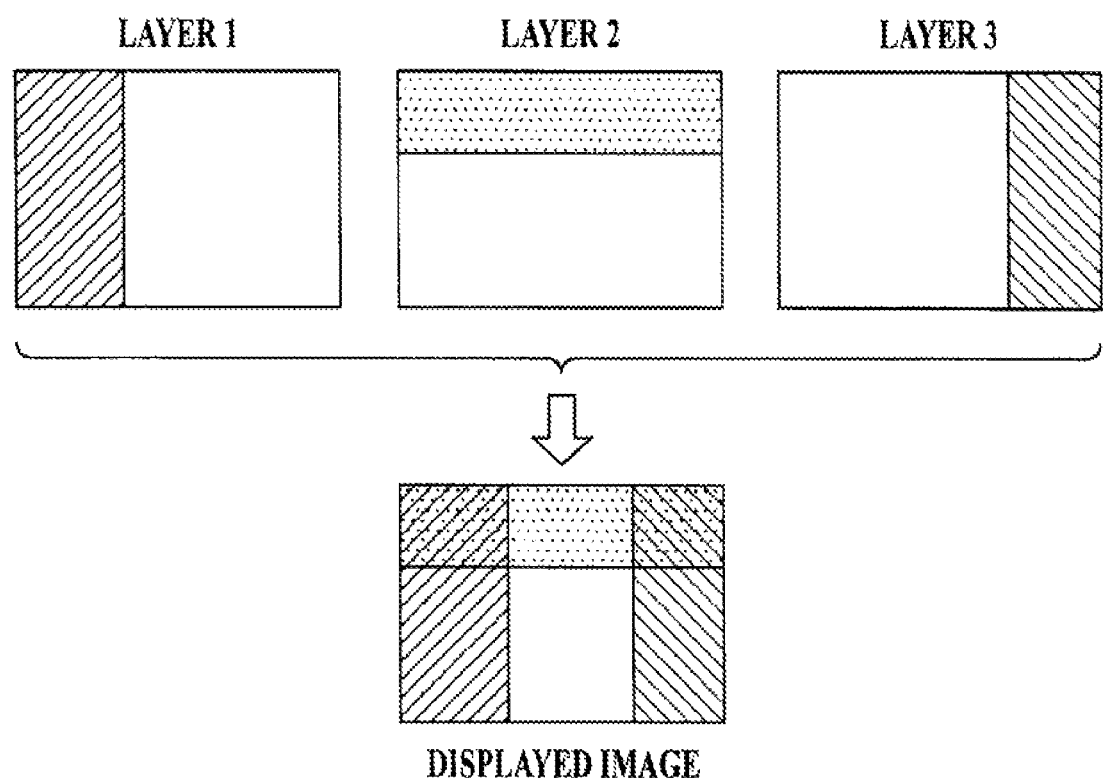
FIG. 4 is a conceptual diagram showing a screen display method according to the first embodiment of the present invention.
Figure 5:
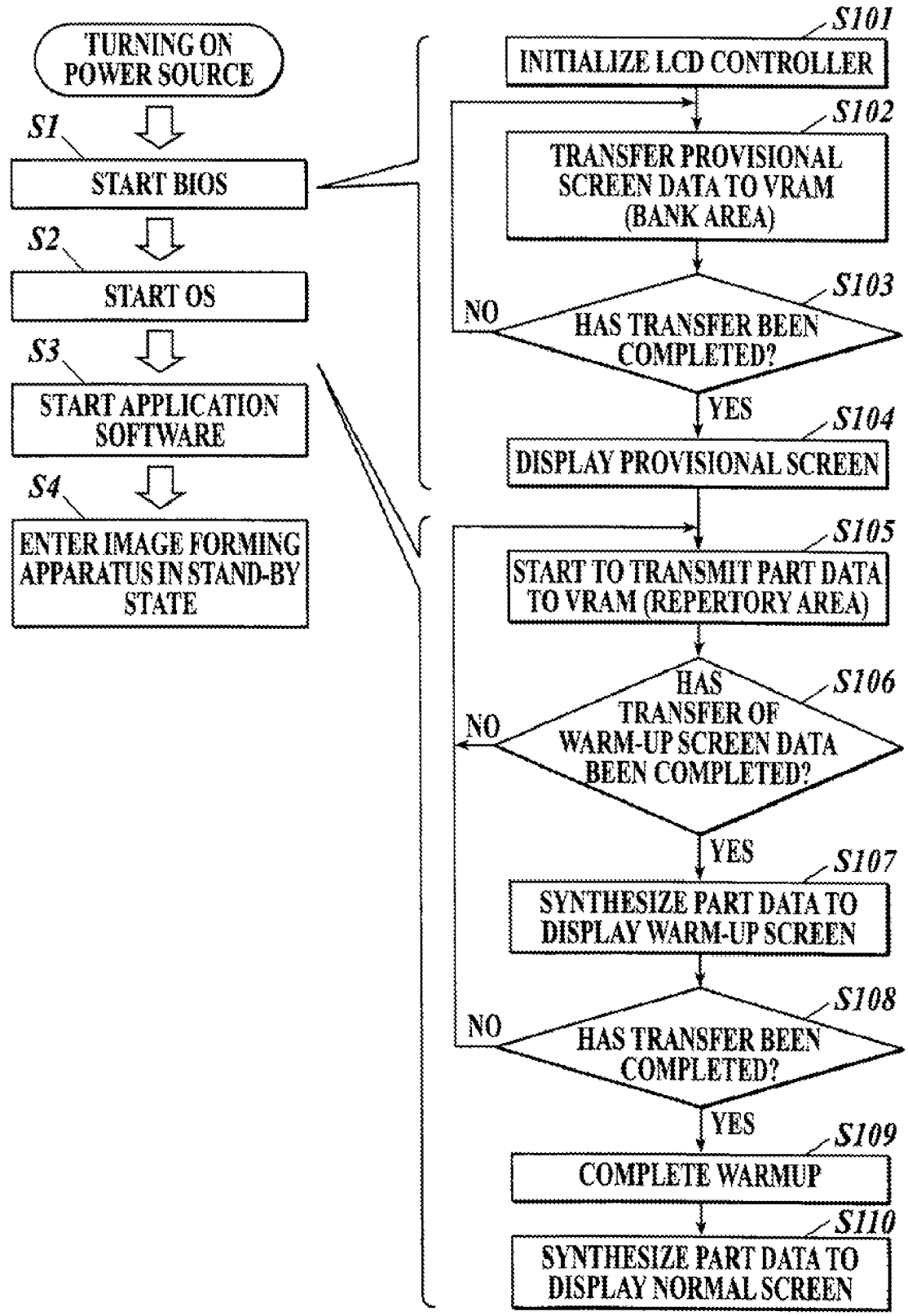
FIG. 5 is a flow chart showing the operation of the image forming apparatus according to the first embodiment of the present invention.
Figure 6C:
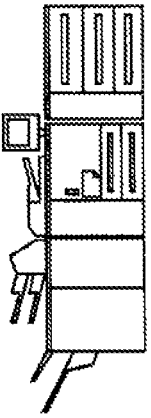
FIG. 6C is a view showing an example of a screen (warm-up screen) displayed in the display section in the image forming apparatus according to the first embodiment of the present invention.
Figure 8:
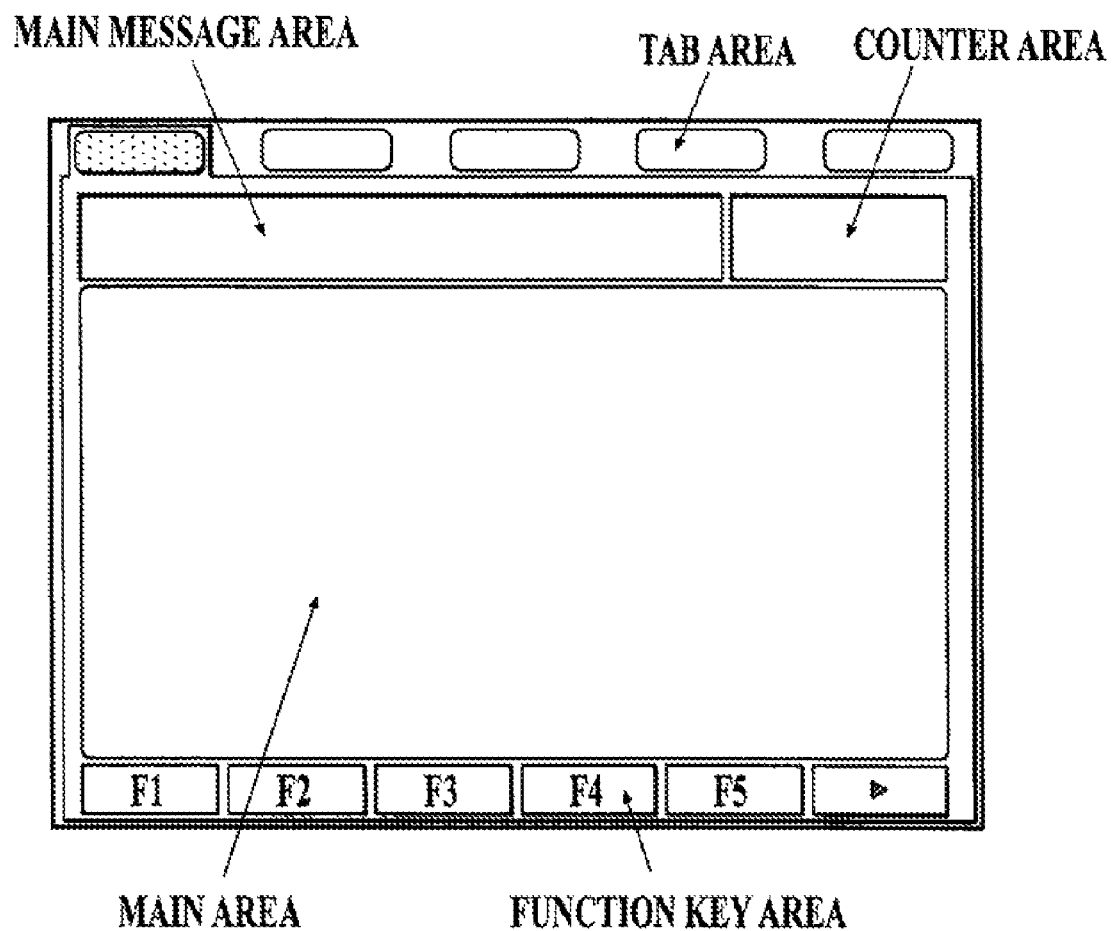
FIG. 8 is a view showing a template of the normal screen in the image forming apparatus according to the first embodiment of the present invention.
Figure 9:
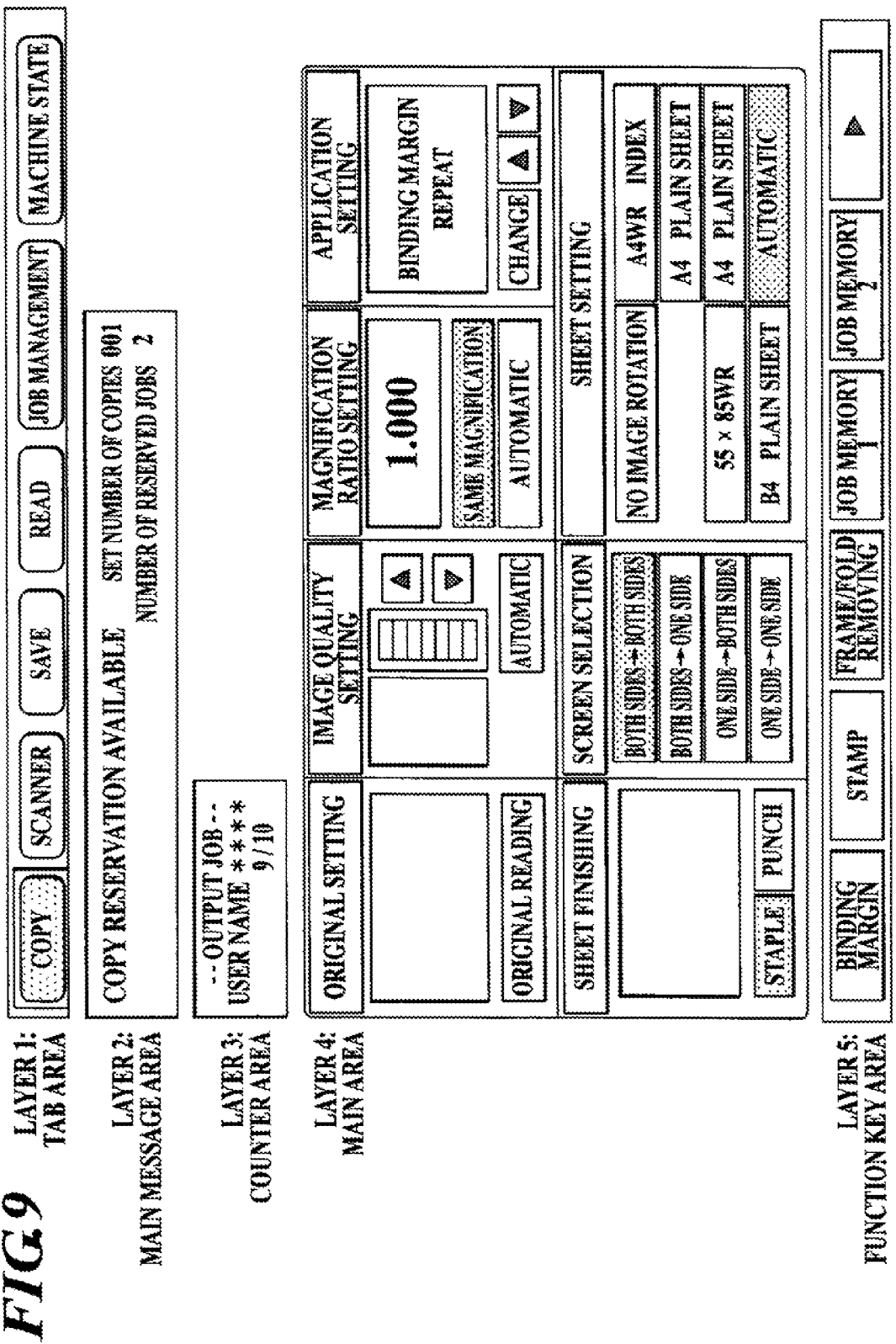
FIG. 9 is a view showing the parts of the normal screen in the image forming apparatus according to the first embodiment of the present invention.
Figure 10:
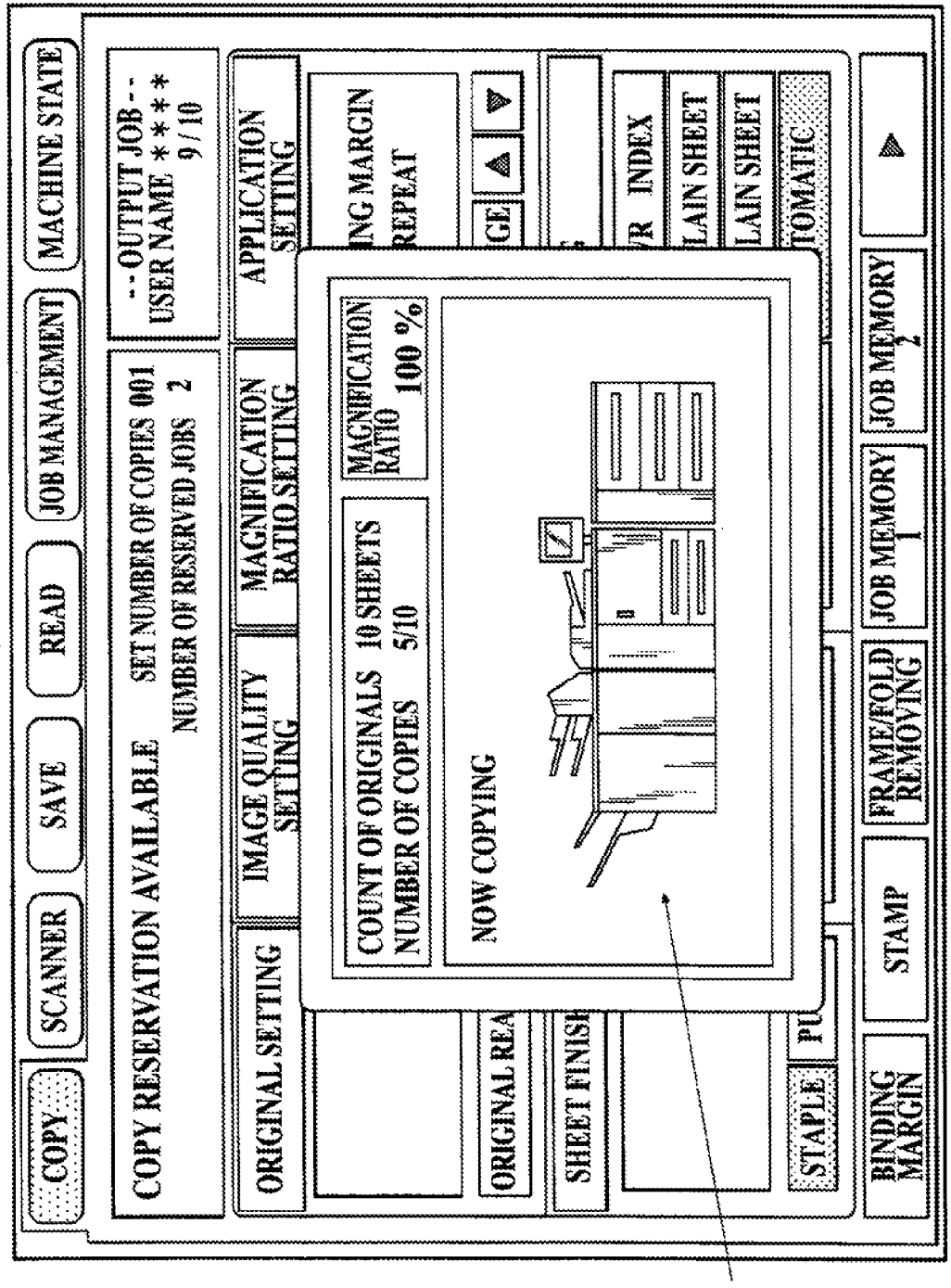
FIG. 10 is a view showing a configuration example of a screen (a screen produced by superposing a pop-up screen on the normal screen) displayed in the display section of the image forming apparatus according to the first embodiment of the present invention.

An image forming apparatus and a screen display method according to a first embodiment of the present invention will be described with reference to FIGS. 1-10 in order to describe the embodiments of the present invention mentioned above in more details. FIG. 1 is a block diagram showing the configuration of the image forming apparatus according to the present embodiment, and FIG. 2 is a block diagram showing another configuration of the image forming apparatus. Moreover, FIG. 3 is a diagram showing the area configuration of a VRAM, and FIG. 4 is a conceptual diagram showing the screen display method of the present embodiment. Moreover, FIG. 5 is a flow chart showing the operation and the transfer procedure of screen data of the image forming apparatus of the present embodiment, FIGS. 6A and 6B are views showing examples of a provisional screen displayed in the display section, and FIG. 6C is a view showing an example of a warm-up screen displayed in the display section. Moreover, FIGS. 7 and 10 are views showing configuration examples of normal screens displayed in the display section. FIG. 8 is a view showing a template, and FIG. 9 is a view showing examples of the parts.

As shown in FIG. 1, the image forming apparatus 10 of the present embodiment comprises a control section 11, a network connecting section 12, a storage section 13, an image processing section 14, an image memory control section 15, an image memory 16, a scanner section 17, a printer section 18, an operation display section 19, and the like. These components are mutually connected through a system bus.

The control section 11 comprises a central processing unit (CPU) 11a, a random access memory (RAM) 11b, a read only memory (ROM) 11c, and the like. The ROM 11c stores a program for controlling the operations of the whole image forming apparatus 10, the data that is the base of an operation screen to be displayed in the operation display section 19 (hereinafter, referred to as screen data), and the like. The RAM 11b stores the data necessary for the control of the CPU 11a and the data needed to be temporarily stored at the time of a control operation, and the like. Then, the CPU 11a functions as the control section 11 for controlling the operations of the whole image forming apparatus 10 in cooperation with the ROM 11c and the RAM 11b.

The network connecting section 12 is an interface, such as a network interface card (NIC) and a modem, for connecting the image forming apparatus 10 with a communication network, and receives print data and the like from a computer terminal and the like through a communication network, such as a local area network (LAN) and a wide area network (WAN).

The storage section 13 comprises a hard disk drive (HDD) and the like, and saves print data obtained from the computer terminal, and the like.

The image processing section 14 performs the processing of producing intermediate data from print data to produce bit map system image data from the produced intermediate data, and the processing of the compression, the expansion, the enlargement, the reduction, the rotation, and the like, of image data.

The scanner section 17 reads an original by using image pickup means, such as a charge coupled device (CCD) image sensor, and performs the analog processing, the A/D conversion, the shading correction, the image compression processing, and the like, of a photoelectrically converted analog signal to obtain image data.

The printer section 18 forms a latent image by radiating the light of a semiconductor laser onto a photosensitive drum based on image data, and performs the processing of charging, exposure, and development to form a toner image on the photosensitive drum and to transfer the toner image onto a sheet medium.

The image memory control section 15 obtains image data from the image processing section 14 and the scanner section 17 to store the obtained image data into the image memory 16, and reads the image data from the image memory 16 to transmit the read image data to the printer section 18.

The operation display section 19 comprises a display device provided with a touch panel on the surface thereof (the display device is a liquid crystal display (LCD) 19a here), a screen data storage section for temporarily storing the screen data of an operation screen to be displayed on the LCD 19a (the screen data storage section is a VRAM 19c), a display control section for controlling these operations (the display control section is an LCD controller 19b here), a conversion circuit for connecting different system buses with each other (for example, the conversion circuit is a bridge IC 19d here), and the like.

Now, in the present embodiment, the control section 11 of the image forming apparatus 10 controls data transfer so as not to stream any screen data into the system bus except for the time of system initialization. That is, the control section 11 performs the control so as to transfer the screen data stored in the working memory 11b of the CPU 11a, or the ROM 11c to the VRAM 19c after the power source of the image forming apparatus 10 has been turned on, and before a function provided to the image forming apparatus 10 (for example, the scanner section 17 or the printer section 18) becomes an operable state.

Moreover, as shown in FIG. 3, the VRAM 19c comprises a part data area for storing the data of individual divided parts of an operation screen (hereinafter, the data will be referred to as part data), a layer data area for producing the data of each layer (hereinafter, the data will be referred to as layer data) by using the part data and for storing the layer data, a display synthesizing area for synthesizing a plurality of pieces of layer data to produce screen data, a bank area for storing the screen data of a provisional screen and the like, and the like. The part data is stored in the ROM 11c in the control section 11. The CPU 11a reads the part data from the ROM 11c to transfer the read part data to the VRAM 19c. The LCD controller 19b reads the part data from the VRAM 19c to produce the layer data shown in FIG. 4 by the use of the read part data, and synthesizes the produced layer data to make the LCD 19a display an operation screen.

Therefore, the contention between image data and screen data is hereby removed, and the lowering of the data transfer performance is suppressed. The operation screen can be thereby displayed without damaging the intrinsic performance of the image forming apparatus 10.

Incidentally, FIG. 1 illustrates the image forming apparatus 10 of the present embodiment, and the image forming apparatus 10 is only required to provide at least the control section 11 and the operation display section 19, and the other elements are suitably changeable. Moreover, although FIG. 1 shows the case where the operation display section 19 comprises the LCD 19a, the LCD controller 19b, the VRAM 19c, and the bridge IC 19d, and the capacity of the VRAM 19c is enlarged, it is also possible to configure the operation display section 19 to be provided with, for example, a secondary buffer control circuit 19e and a secondary buffer 19f between the LCD controller 19b and the LCD 19a, as shown in FIG. 2.

In the following, the operations of the image forming apparatus 10 of the present embodiment will be described with reference to the flow chart of FIG. 5. The operation procedure of the whole image forming apparatus 10 is shown on the left side of FIG. 5, and the procedure of screen display is shown on the right side of FIG. 5.

When the power source of the image forming apparatus 10 is first turned on, a basic input/output system (BIOS) starts at a step S1, and the control section 11 of the image forming apparatus 10 recognizes each component connected to the control section 11. The CPU 11a of the control section 11 next reads an operation system (OS) from the ROM 11c or the storage section 13, and expands the read OS in the RAM 11b to start the OS at a step S2. The CPU 11a of the control section 11 subsequently reads application software from the ROM 11c or the storage section 13, and expands the read application software in the RAM 11b to start the application software at a step S3. The image forming apparatus 10 hereby becomes a stand-by state at a step S4.

Although the conventional image forming apparatus here has performed the transfer of screen data regardless of the state of the image forming apparatus, the image forming apparatus 10 of the present embodiment completes the transfer of the screen data after the power source has been turned on (to be exact, after the CPU 11a has recognized the operation display section 19) and before the image forming apparatus 10 becomes the stand-by state.

To put it concretely, the CPU 11a of the control section 11 initializes the LCD controller 19b at a step S101. As the occasion demands, the CPU 11a reads the screen data for a provisional screen from the ROM 11c at a step S102, and transfers the read provisional screen data to the bank area of the VRAM 19c at a step S102. Then, when the transfer of the provisional screen data has been completed at a step S103, the LCD controller 19b reads the provisional screen data from the bank area of the VRAM 19c, and makes the LCD 19a display the provisional screen at a step S104.

The provisional screen is a screen to be displayed before the display of an initial screen, and can be configured as, for example, the ones shown in FIGS. 6A and 6B. But the configuration of the provisional screen is arbitrary, and it is also possible to omit the display of the provisional screen.

Part data is next transferred to the VRAM 19c. Because a normal screen cannot be produced until the application software for controlling the scanner section 17 and the printer section 18 is started, the present embodiment transfers the part data to form a warm-up screen composed of the items capable of being displayed even when the application software is not started at the same time.

To put it concretely, the CPU 11a of the control section 11 reads the part data to form the warm-up screen and the normal screen from the ROM 11c, and transfers the read part data to the part data area of the VRAM 19c at a step S105. Then, when the transfer of the part data for the warm-up screen has been completed at a step S106, the LCD controller 19b reads the part data from the part data area of the VRAM 19c to produce layer data based on the read part data, and synthesizes the produced layer data in the display synthesizing area to make the LCD 19a display a warm-up screen at a step S107.

The warm-up screen is configured as shown in, for example, FIG. 6C, and an animation expressing that the image forming apparatus 10 is in a state of warm-up, and the like, are displayed. Incidentally, the configuration of the warm-up screen is arbitrary, and the display of the warm-up screen can be also omitted.

Next, when the transfer of all pieces of part data has been completed at a step S108, and when the warm-up of the image forming apparatus 10 has been completed at a step S109, the LCD controller 19b reads the part data from the part data area of the VRAM 19c to produce layer data based on the read part data, and synthesizes the produced layer data in the display synthesizing area to make the LCD 19a display a normal screen at a step S110.

The normal screen displays the items for setting a function provided to the image forming apparatus 10, and the like. To put it concretely, the normal screen is a screen produced by synthesizing the layers 1-5 shown in FIG. 9 into the respective areas of the template shown in FIG. 8, and the normal screen shown in FIG. 7 is produced by synthesizing layers 1-5 into the tab area, the main message area, the counter area, the main area, and the function key area of the template, respectively. Incidentally, only the thing required for the normal screen is to display the settable items to the various functions (such as the scanner section 17 and the printer section 18) of the image forming apparatus 10, and the configuration of the normal screen is arbitrary. Moreover, when a pop-up screen is displayed above the normal screen, as shown in FIG. 10, only the thing required for the display is to synthesize only the layer of the pop-up screen, by configuring the screen with the layers.

As described above, in the image forming apparatus 10 of the present embodiment, the VRAM 19c comprises at least the display synthesizing area, the layer data area, and the part data area; the screen data to be displayed on the LCD 19a is stored in the ROM 11c of the control section 11 as the part data; the CPU 11a transfers the part data to the VRAM 19c after the turning-on of the power source of the image forming apparatus 10 and before each function becomes the operable state thereof; and, after each of the functions of the image forming apparatus 10 has become the operable state thereof, the CPU 11a controls the LCD controller 19b to perform the following operations: producing layer data based on the part data; synthesizing the layer data: and controlling the LCD 19a to make the LCD 19a display an operation screen. Consequently, the lowering of the data transfer performance owing to the contention of data can be suppressed, and a desired screen can be displayed on the LCD 19a without damaging any intrinsic performance of the image forming apparatus 10.

[Embodiment 2]

Figure 11:
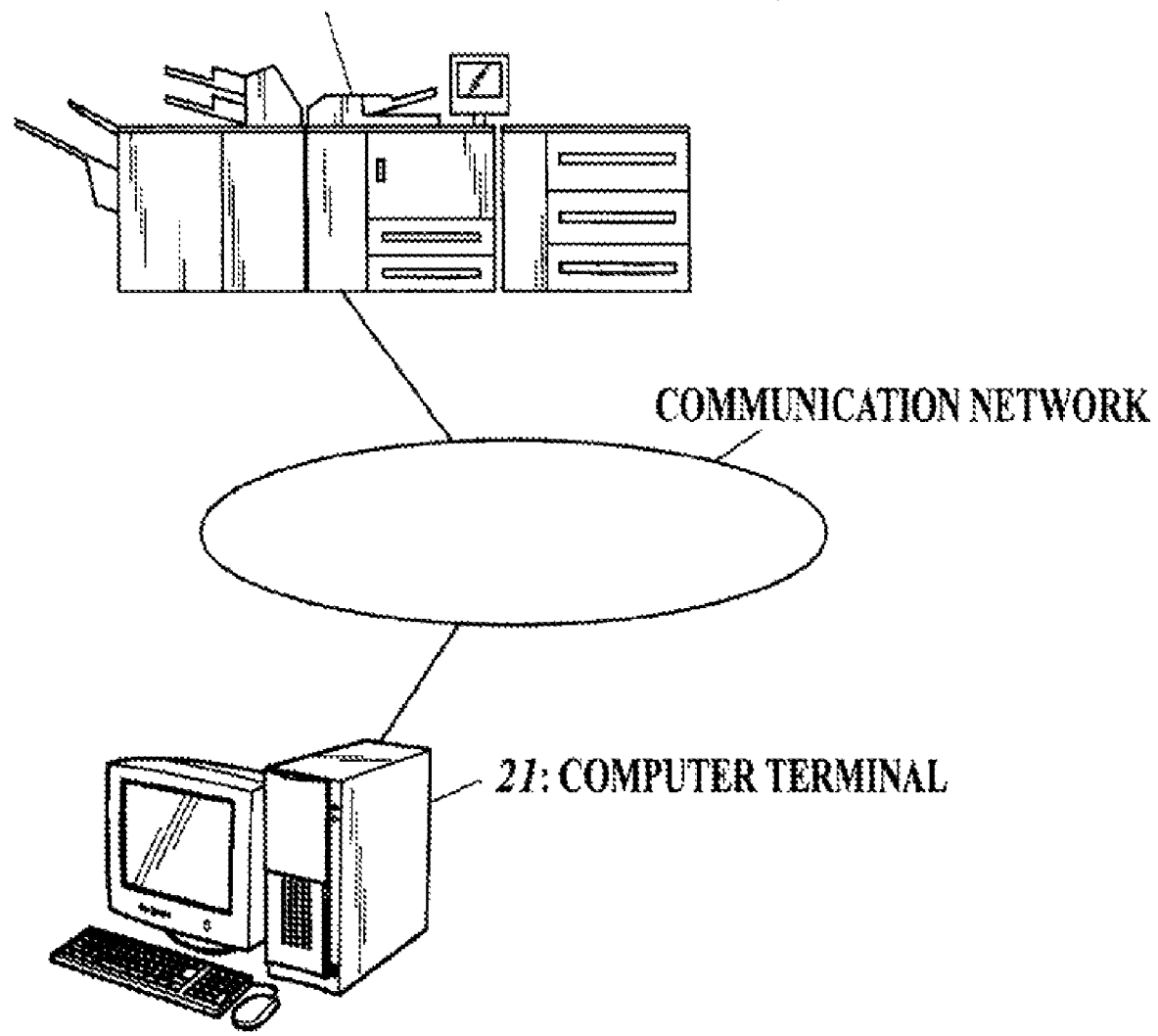
FIG. 11 is a view showing the configuration of an image forming system according to a second embodiment of the present invention.
Figure 12:
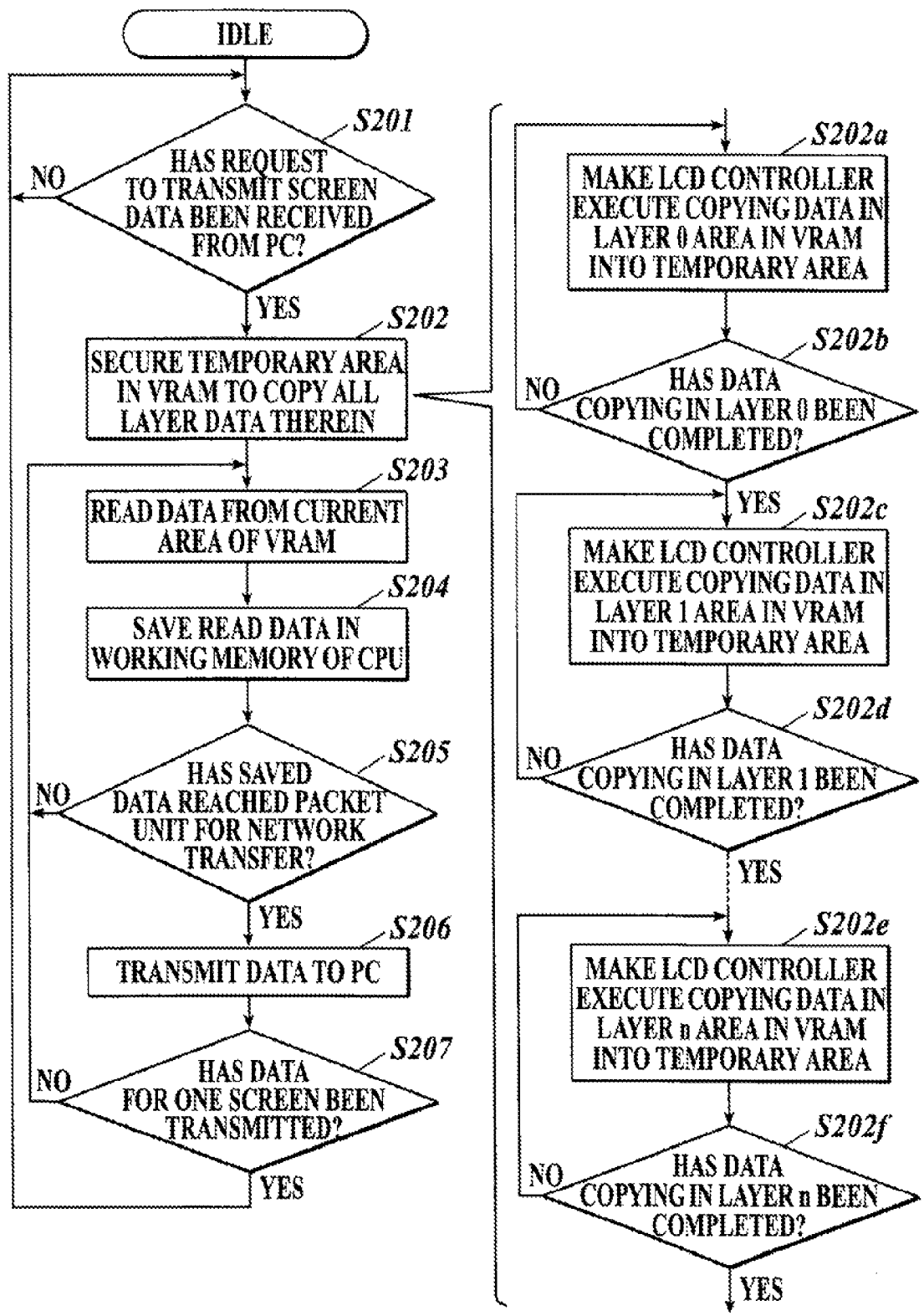
FIG. 12 is a flow chart showing a transfer procedure of screen data according to the second embodiment of the present invention.

Next, an image forming apparatus, an image forming system, and a screen display method according to a second embodiment of the present invention will be described with reference to FIGS. 11 and 12. FIG. 11 is a view schematically showing the configuration of the image forming system of the present embodiment, and FIG. 12 is a flow chart showing a transfer procedure of screen data of the present embodiment.

Although in the first embodiment described above, the case where an operation screen is displayed in the operation display section 19 of the image forming apparatus 10 has been shown, it is also possible to display the operation screen in the display section of a computer terminal 21 in an image forming system 20, in which one or a plurality of computer terminals 21, such as personal computers, for operating the image forming apparatus 10 is connected to one or a plurality of image forming apparatus 10 through a communication network, such as a LAN or a WAN, as shown in FIG. 11.

In this case, when the screen data is generated by the CPU 11a of the image forming apparatus 10, the load imposed on the screen control of the CPU 11a is enlarged. When screen display is performed with the computer terminal 21 via the network, the processing of the screen data is not performed in the CPU 11a but the control of transferring the screen data in the VRAM 19c to the computer terminal 21 is performed in the present invention.

In the following, the operations of the image forming system 20 of the present embodiment (the transfer of screen data especially) will be described with reference to the flow chart of FIG. 12.

When the control section 11 of the image forming apparatus 10 receives a request to transmit screen data from the computer terminal 21 when the image forming apparatus 10 is in an idle state at a step S201, the CPU 11a secures a temporary area (for example, a display synthesizing area) in the VRAM 19c for the LCD controller 19b, and makes the LCD controller 19b execute the processing of copying all layer data into the temporary area at a step S202.

To put it more concretely, the CPU 11a makes the LCD controller 19b copy the layer data in a layer 0 area in the VRAM 19c to the temporary area at a step S202a. When the copying of the data of the layer 0 has been completed at a step S202b, the CPU 11a similarly makes the LCD controller 19b copy the layer data in layers 1-n to the temporary area in order at steps S202c-202f, respectively. After that, the LCD controller 19b synthesizes the layer data copied in the temporary area to produce screen data.

The CPU 11a next performs data reading of the current area of the VRAM 19c at a step S203, and saves the read screen data in the working memory (RAM 11b) at a step S204.

Next, the CPU 11a judges whether the saved layer data has reached a packet unit for network transfer or not at a step S205. When the saved layer data has reached the packet unit, the CPU 11a transmits screen data to the computer terminal 21 by the use of the network connecting section 12 at a step S206.

Then, the CPU 11a judges whether the data for one screen has been transmitted or not at a step S207. When the data for one screen has not been transmitted, the CPU 11a returns its processing to the step S203, and performs data reading. When the data for one screen has been transmitted, the CPU 11a returns to the idle state.

As described above, when screen display is performed via the network with the computer terminal 21, the processing of screen data is not performed on the CPU 11a, and the control of transferring the screen data synthesized in the VRAM 19c to the computer terminal 21 is performed. Consequently, the load imposed on the screen control of the CPU 11a can be suppressed.

Incidentally, although the screen display in the image forming apparatus 10 and the computer terminal 21 connected to the image forming apparatus 10 through the network has been described in the aforesaid embodiments, the present invention is not limited to the above-mentioned embodiments. The present invention can be similarly applied to arbitrary equipment that includes a control section and a display section to display screen data stored in a memory of the control section on the display section.

The present U.S. patent application claims a priority under the Paris Convention of Japanese patent application No. 2007-125531 filed on May 10, 2007, which shall be a basis of correction of an incorrect translation.

What is claimed is:

1. An image forming apparatus, comprising:
a control section; and
a display section connected to a system bus of the control section, wherein the display section comprises:
a display device;
a screen data storage section to temporarily store screen data of an operation screen; and
a display control section to instruct the display device to display the operation screen of the image forming apparatus based on the screen data, and
wherein the control section comprises:
a storage section to store the screen data of the operation screen which pertains to a function provided to the image forming apparatus,
wherein the control section transfers the screen data of all operation screens including an initial screen and a normal screen to the screen data storage section through the system bus after a power source of the image forming apparatus is turned on and before the function becomes an operable state, the screen data being stored in the storage section in advance, and
wherein the display control section instructs the display device to display the operation screen based not on the screen data stored in the storage section but on the screen data stored in the screen data storage section, before the function of the image forming apparatus becomes the operable state and after the function has become the operable state.

2. The image forming apparatus of claim 1, wherein the screen data stored in the storage section is part data for each divided part of the operation screen,
wherein the display control section produces layer data for each layer based on the part data for each divided part of the operation screen, the part data being transferred from the storage section to be stored in the screen data storage section, and synthesizes the layer data for each layer to produce screen data for display so as to instruct the display device to display the operation screen based on the produced screen data for display, and
wherein the screen data storage section stores the part data which is transferred from the storage section and is produced by dividing the operation screen, the layer data for each layer produced from the part data, and the screen data for display produced by synthesizing the layer data for each layer.

3. The image forming apparatus of claim 2, further comprising:
a connecting section to perform communication with a computer terminal via network,
wherein the display control section transfers the layer data for each layer, which is stored in the screen data storage section, to the computer terminal by the connecting section of the network, when a transmission of the screen data of the operation screen is requested from the computer terminal.

4. An image forming system, comprising:
an image forming apparatus; and
a computer terminal which is connected through a communication network, the image forming apparatus including a control section and a display section connected to a system bus of the control section, wherein the display section comprises:
a display device;
a screen data storage section to temporarily store screen data of an operation screen; and
a display control section to instruct the display device to display the operation screen of the image forming apparatus based on the screen data, and wherein the control section comprises:
a storage section to store the screen data of the operation screen which pertains to a function provided to the image forming apparatus,
wherein the control section transfers the screen data of all operation screens including an initial screen and a normal screen to the screen data storage section through the system bus after a power source of the image forming apparatus is turned on and before the function becomes an operable state, the screen data being stored in the storage section in advance, and wherein the display control section instructs the display device to display the operation screen based not on the screen data stored in the storage section but on the screen data stored in the screen data storage section, and transfers the screen data, which is stored in the screen data storage section, before the function of the image forming apparatus becomes the operable state and after the function has become the operable state, to the computer terminal when a transmission of the screen data of the operation screen is requested from the computer terminal.

5. The image forming system of claim 4, wherein wherein the screen data stored in the storage section is part data for each divided part of the operation screen, wherein the screen data storage section stores the part data which is transferred from the storage section and is produced by dividing the operation screen, the layer data for each layer produced from the part data, and the screen data for display produced by synthesizing the layer data for each layer, and wherein the display control section produces the layer data for each layer based on the part data for each divided part of the operation screen, the part data being transferred from the storage section to be stored in the screen data storage section, and synthesizes the layer data for each layer to produce screen data for display so as to instruct the display device to display the operation screen based on the produced screen data for display, and transfers the layer data which is stored in the screen data storage section, to the computer terminal when the transmission of the screen data of the operation screen is requested from the computer terminal.

6. A screen display method using an image forming apparatus including a display section connected to a system bus of a control section, the method comprising:

a first step of turning on a power source of the image forming apparatus;

a second step of transferring the screen data of all operation screens including an initial screen and a normal screen to a screen data storage section of the display section through the system bus after the turning-on of the power source of the image forming apparatus and before a function of the apparatus becomes an operable state, the screen data being stored in a storage section of the control section in advance; and a third step of displaying the operation screen on a display device of the display section based not on the screen data stored in the storage section but on the screen data stored in the screen data storage section, before the function of the image forming apparatus becomes the operable state and after the function has become the operable state.

7. The screen display method of claim 6, wherein the screen data stored in the storage section is configured as part data for each divided part of the operation screen, in the second step, the part data for each divided part is transferred from the storage section to the screen data storage section, and in the third step, layer data for each layer is produced based on the part data for each part, and the layer data for each layer is synthesized to produce screen data for display so as to display the operation screen on the display device, based on the produced screen data for display.

8. The screen display method of claim 6, further comprising:

a fourth step of transferring the screen data, which is stored in the screen data storage section, to a computer terminal, when a transmission of the screen data of the operation screen is requested from the computer terminal which is connected to the image forming apparatus through a communication network.

9. The screen display method of claim 8, wherein in the fourth step, the screen data which is transferred to the computer terminal is the layer data for each layer.

* * * * *